United States Patent Office 2,764,581
Patented Sept. 25, 1956

2,764,581

PRODUCTION OF PHARMACEUTICALLY ACTIVE HEXAMETHYLENETETRAMINE PRODUCTS

Heinrich Scholz, Heinz Oettel, and Heinrich Zeller, Ludwigshafen (Rhine), Germany, assignors to Badische Anilin- & Soda-Fabrik Aktiengesellschaft, Ludwigshafen (Rhine), Germany No Drawing. Application August 12, 1955,
Serial No. 528,131

Claims priority, application Germany September 2, 1954

1 Claim. (Cl. 260—248.5)

This invention relates to a process for the production of pharmaceutically-active products.

We have found that products with unexpected, valuable pharmacological properties are obtained by reacting hexamethylene tetramine in approximately the mol ratio 2:1 to 5:0 with complex-forming saturated aminocarboxylic acids containing at least two carboxylic groups for each nitrogen atom.

Examples of such aminocarboxylic acids, among others, are iminodiacetic acid, nitrilotriacetic acid, ethylene-di-amine-N.N'-tetra-acetic acid, diaminodiethylether- and diamino-diethylsulfide-N.N'-tetra-acetic acids, pyrolidine-2.5-dicarboxylic-acid-N-acetic acid, 1.2-ethylene-bis-(N-pyrrolidine-2'.5'-dicarboxylic acid) and 1.2-diamino-cyclohexane-N.N'-tetraacetic acid. The reaction of these aminocarboxylic acids with hexamethylene tetramine is preferably effected by stirring the solid aminocarboxylic acid into an aqueous solution of hexamethylene tetramine, the whole thus passing into solution with spontaneous heating. In many cases it is advisable to cool, or a short heating may be necessary.

Whereas the said aminocarboxylic acids are in general difficultly soluble in water, the new products obtainable according to this invention have very good solubility in water and this facilitates their therapeutic use.

The new products, of which the constitution has not yet been clarified, have remarkable pharmacological properties which the components lack. Thus in neutral or weakly alkaline medium they exert strong growth-inhibiting action on the growth of many bacteria, whereas hexamethylene tetramine exerts bacteriostatic action only in acid medium. Since they have very good compatibility by reason of their neutrality and their low toxicity, they can be used with advantage for example for the disinfection of the urinary passage. In addition to this disinfecting action, they stimulate the expulsion of urinary and renal calculi, and in addition to the calcium-dissolving action, their diuretic and spasmolytic plays an advantageous role. They can therefore be used to a far greater extent for the treatment of ailments of the urinary tract than hexamethylene tetramine alone.

It is known that any use for therapeutic purposes of the aminocarboxylic acids themselves or their alkali salts is out of the question by reason of their physiologically unfavourable pH values (about 2 or 12, respectively). It is only after they have been reacted with hexamethylene tetramine that it is possible to use them for the treatment of ailments of the urinary tract.

The new products may be used alone or together with other medicaments, as for example with the reaction products of hexamethylene tetramine with camphoric acid, with sodium benzoate, or with the so-called hexamethylene tetramine anhydromethylene citrate.

The following examples will further illustrate this invention but the invention is not restricted to these examples. The parts are by weight.

Example 1

292 parts of ethylenediamine-N.N'-tetra-acetic acid are stirred at room temperature into a solution of 560 parts of hexamethylene tetramine in 840 parts of water. The former thereby gradually passes into solution while the temperature rises to about 40° C. The solution, which has the pH value 6, is evaporated to dryness under reduced pressure, and a colorless, readily watersoluble powder is obtained in practically quantitative yield which in aqueous solution has a diuretic action and speedily relieves spasms due to renal calculus colic so that freedom from pain is obtained. The renal calculi often pass away with the urine after a short time.

Products having similar action are obtained by using 420 or 700 parts of hexamethylene tetramine for the reaction.

Example 2

191 parts of nitrilo-triacetic acid are stirred into an aqueous solution of 420 parts of hexamethylene tetramine. The resultant solution gives, by evaporation under reduced pressure, a colorless, readily water soluble powder having properties similar to those of the products obtainable according to Example 1.

Similar products are obtained by the use of 280 or 350 parts of hexamethylene tetramine.

Example 3

560 parts of hexamethylene tetramine are stirred into an aqueous suspension of 340 parts of 1.2-diaminocyclohexane-N.N'-tetra-acetic acid at room temperature and then heated until all has dissolved. The resulting colorless solution can be used as such or converted by evaporation under reduced pressure into a colorless, readily watersoluble crystal powder. The aqueous solution has a spasmolytic and analgesic effect in renal colic and promotes the expulsion of the calculi.

Instead of 1.2-diaminocyclohexane-N.N'-tetra-acetic acid there may be used with a similar result 336 parts of diamino-diethyl-ether-N.N'-tetra-acetic acid or 350 parts of diamino diethyl-sulfide-N.N'-tetra-acetic acid.

A somewhat smaller amount or a larger amount of hexamethylene tetramine can be used instead of the above-mentioned amount.

Example 4

320 parts of ethylene-1.2-bis-(N-pyrrolidine-2'.5'-dicarboxylic acid) are stirred with 560 parts of hexamethylene tetramine and 1200 parts of water at 70° C. until all has dissolved. By evaporating the solution at reduced pressure, a colorless, readily watersoluble powder is obtained having properties similar to those of the products obtainable according to the preceding examples.

What we claim is:

Improved pharmaceutically active products obtained by reacting from about two to about five mols of hexamethylene tetramine with one mol of saturated complex-forming amino-carboxylic acids selected from the group consisting of iminodiacetic acid, nitrilotriacetic acid, ethylenediamine-N.N'-tetraacetic acid, diamino diethyl ether and di-aminodiethylsulfide-N.N'-tetraacetic acids, pyrrolidine-2.5-dicarboxylic acid-N-acetic acid, 1.2-ethylene-bis-(N-pyrrolidine-2'.5'-dicarboxylic acid) and 1.2-diaminocyclohexane-N.N'-tetraacetic acid.

No references cited.